United States Patent Office 3,132,136
Patented May 5, 1964

3,132,136
DERIVATIVES OF 6-BENZAMIDO-
PENICILLANIC ACID
Frank Peter Doyle, Betchworth, John Herbert Charles Nayler, Catford, London, and George Newbolt Rolinson, Brockham Park, Betchworth, England, assignors to Beecham Group Limited, Brentford, Middlesex, England, a British company
No Drawing. Filed Oct. 25, 1960, Ser. No. 64,735
Claims priority, application Great Britain July 15, 1959
5 Claims. (Cl. 260—239.1)

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by gram-positive bacteria and more particularly, relates to novel, disubstituted 6-benzamido-penicillanic acids and nontoxic salts thereof.

This application is a continuation-in-part of our prior, copending application Serial Number 49,852, filed August 16, 1960, which in turn is a continuation-in-part of our prior, copending application Serial Number 23,881, filed May 2, 1960, and issued September 6, 1960, as United States Patent 2,951,839, which in turn is a continuation-in-part of our prior, copending application Serial Number 831,483, filed August 4, 1959, and now abandoned.

Antibacterial agents such as benzylpenicillin have proved highly effective in the past in the therapy of infections due to gram-positive bacteria but such agents suffer from the serious drawbacks of being unstable in aqueous acid, e.g., upon oral administraton, and of being ineffective against numerous so-called resistant strains of bacteria, e.g., penicillin-resistant strain of *Staphylococcus aureus* (*Micrococcus pyogenes* var. *aureus*). In addition, benzylpenicillin is not an effective agent against many bacteria which produce penicillinase. Many of the compounds of the present invention, in addition to their potent antibacterial activity, exhibit resistance to destruction by acid or by penicillinase or are effective against benzylpenicillin-resistant strains of bacteria or inhibit benzylpenicillinase and thus potentiate the action of benzylpenicillin when admixed therewith and are safe for use in patients who cannot be given benzylpenicillin because they exhibit allergic reactions thereto.

There is provided, according to the present invention, a member selected from the group consisting of an acid having the formula ![Structure]

wherein $R_1$ represents halogen (i.e. chloro, bromo, iodo or fluoro) or (lower)alkyl and $R_2$ represents (lower)alkyl, and nontoxic salts thereof, including nontoxic metallic salts such as sodium, potassium, calcium and aluminum, the ammonium salt and substituted ammonium salts, e.g., salts of such nontoxic amines as trialkylamines, including triethylamine, procaine, dibenzylamine, N-benzyl-beta-phenethylamine, 1-ephenamine, N,N'-dibenzylethylenediamine, dehydroabiethylamine, N,N'-bis-dehydroabiethylenediamine, N-(lower)alkylpiperidines, e.g., N-ethylpiperdine, and other amines which have been used to form salts with benzylpenicillin. The term "(lower)alkyl" as used herein means both straight and branched chain aliphatic hydrocarbon radicals having from one to ten carbon atoms such as methyl, ethyl, propyl, isopropyl, butyl, isobutyl, t-butyl, amyl, hexyl, 2-ethylhexyl, heptyl, decyl, etc. Also included within the scope of the present invention are easily hydrolyzed esters which are converted to the free acid form by chemical or enzymatic hydrolysis.

The products of the present invention are prepared by reaction of 6-aminopenicillanic acid, preferably in the form of a neutral salt such as the sodium salt or the triethylamine salt, with an acid chloride having the formula:

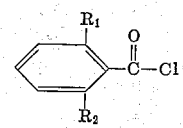

wherein $R_1$ and $R_2$ have the meaning set forth above, or its functional equivalent as an acylating agent for a primary amino group. Such equivalents include the corresponding carboxylic acid bromides, acid anhydrides and mixed anhydrides with other carboxylic acids, including monoesters, and particularly lower aliphatic esters, of carbonic acid.

The substituted benzoic acids and benzoyl chlorides which are used in the preparation of the compounds of the present invention may be prepared by a variety of synthetic methods which are common in the art. Most of these starting compounds are described in the prior art and many of them are commercially available. Detailed discussions of methods for the preparation of these starting materials are found in such reference works as the "Chemistry of Carbon Compounds," E. H. Rodd, editor (1956), Elsevier Publishing Company, particularly in volumes IIIA and IIIB.

Thus, an elegant procedure for preparing a compound of the present invention by way of a mixed anhydride with ethoxy- or isobutoxy-carbonic acid comprises mixing 0.01 mole of an acid (whose acid chloride is set forth above), 0.01 mole isobutyl chloroformate and 0.011 mole tertiary hydrocarbonyl or aliphatic amine such as triethylamine in an anhydrous, inert and preferably water-miscible solvent such as p-dioxane (e.g., 20 ml.) and if desired 2 ml. pure, dry acetone for about thirty minutes in the cold, e.g., at about 4° C. To this solution of the mixed anhydride there is then added a chilled solution of 0.01 mole 6-aminopenicillanic acid and 0.01 mole tertiary hydrocarbonyl amine, e.g., triethylamine, in, for example, 20 ml. of a solvent such as water. The reaction mixture is stirred for a period of an hour or so to form the substituted ammonium salt of the desired product. The mixture may then, if desired, be extracted at alkaline pH (such as pH 8; aqueous sodium bicarbonate may be used, for example, if necessary to adjust the pH) with a water-immiscible solvent such as ether to remove unreacted starting materials. The product in the aqueous phase is then converted to the free acid, preferably in the cold under a layer of ether by the addition of dilute mineral acid, e.g., 5 N $H_2SO_4$ to pH 2. The free acid is then extracted into a water-immiscible, neutral organic solvent such as ether and the extract is washed with water quickly in the cold, if desired, and then dried, as with anhydrous $Na_2SO_4$. The product in the ethereal extract in its free acid form is then converted to any desired metal or amine salt by treatment with the appropriate base, e.g., a free amine such as procaine base or a solution of potassium 2-ethylhexanoate in dry n-butanol. These salts are usually insoluble in solvents such as ether and can be recovered in pure form by simple filtration.

Another method of preparing an ethereal solution of the acid form of a compound of the present invention comprises preparing a solution in 20 ml. water of 0.00463 mole 6-aminopenicillanic acid and 1.56 gm. sodium bicarbonate, adding 0.00476 mole of an acid chloride whose formula is set forth above and shaking vigorously at room temperature, e.g., for twenty to sixty minutes. The mixture is then extracted with ether to remove unreacted or hydrolyzed starting materials. The solution is then acidified (preferably in the cold) to pH 2, as with dilute sulfuric acid, and the free acid form of the product is extracted into ether (e.g., two portions of 25 ml.). This ethereal extract is dried, as with anhydrous sodium sulfate, and the drying agent is removed to leave a dry ethereal solution from which the product is easily isolated, preferably in the form of an ether-insoluble salt such as the potassium salt. This procedure is used when the acid chloride reacts with a primary amine more rapidly than it does with water, as determined by simple test. In this procedure the acid chloride may be replaced by an equimolar amount of the corresponding acid bromide or acid anhydride.

Since some of the antibiotic susbtances obtained by the process of this invention are relatively unstable compounds which readily undergo chemical changes resulting in the loss of an antibiotic activity, it is desirable to choose reaction conditions which are sufficiently moderate to avoid their decomposition. The reaction conditions chosen will, of course, depend largely upon the reactivity of the chemical reagent being used. In most instances, a compromise has to be made between the use of very mild conditions for a lengthy period and the use of more vigorous conditions for a shorter time with the possibility of decomposing some of the antibiotic substance.

The temperature chosen for the process of preparation of the derivatives of penicillanic acid should in general not exceed 30° C. and in many cases a suitable temperature is ambient temperature. Since the use of strongly acid or alkaline conditions in the process of this invention should be avoided, it has been found preferable to perform the process at a pH of from 6 to 9, and this can conveniently be achieved by using a buffer, for example, a solution of sodium bicarbonate, or a sodium phosphate buffer. In addition to the use of aqueous media for the reaction, including filtered fermentation broths or aqueous solutions of crude 6-aminopenicillanic acid, use can be made of organic solvents which do not contain reactive hydrogen atoms. Examples of such inert solvents are dimethylformamide, dimethylacetamide, chloroform, acetone, methyl isobutyl ketone and dioxane. Frequently, it is highly satisfactory to add an aqueous solution of a salt of 6-aminopenicillanic acid to a solution of the acylating agent in an inert solvent and preferably in an inert solvent which is miscible with water, such as acetone or dimethylformamide. Vigorous stirring is, of course, advisable when more than one phase is present, e.g., solid and liquid or two liquid phases.

At the conclusion of the reaction, the products are isolated, if desired, by the techniques used with benzylpenicillin and phenoxymethylpenicillin. Thus, the product can be extracted into diethyl ether or n-butanol at acid pH and then recovered by lyophilization or by conversion to a solvent-insoluble salt, as by neutralization with an n-butanol solution of potassium 2-ethylhexanoate, or the product can be precipitated from aqueous solution as a water-insoluble salt of an amine or recovered directly by lyophilization, preferably in the form of a sodium or potassium salt. When formed as the triethylamine salt, the product is converted to the free acid form and thence to other salts in the manner used with benzylpenicillin and other penicillins. Thus, treatment of such a triethylamine compound in water with sodium hydroxide converts it to the sodium salt and the triethylamine may be removed by extraction, as with toluene. Treatment of the sodium salt with strong aqueous acid converts the compound to the acid form, which can be converted to other amine salts, e.g., procaine, by reaction with the amine base. Salts so formed are isolated by lyophilization or, if the product is insoluble, by filtration. A particularly elegant method of isolating the product as a crystalline potassium salt comprises extracting the product from an acidic, aqueous solution (e.g., pH 2) into diethyl ether, drying the ether and adding at least one equivalent of a solution of potassium 2-ethylhexanoate (e.g., 0.373 gm./ml.) in dry n-butanol. The potassium salt forms, precipitates, usually in crystalline form, and is collected by filtration or decantation.

6-aminopenicillanic acid is prepared according to Batchelor et al. (Nature 183, 257, 258, January 24, 1959), or Belgian Patent 569,728.

A typical procedure used in preparing the compounds of the present invention is as follows:

PROCEDURE A

Triethylamine (2.02 gm., 2.8 ml., 0.020 mole) was added dropwise to a cooled, stirred suspension of p-toluic acid (2.72 gm., 0.020 mole) in 40 ml. dioxane (dried over sodium), followed by the addition of isobutylchoroformate (2.73 gm., 0.020 mole) over 5–10 minutes at 12–13° C. The solution was stirred about 15 minutes, lowering the temperature to about 8° C. and then there was added over about ten minutes a solution of 6-aminopenicillanic acid (4.35 gm., 0.020 mole) in 40 ml. water and 5.5 ml. triethylamine. The mixture was stirred in an ice bath for about one hour and then at room temperature for an additional hour. After adding chilled water, the reddish solution was extracted twice with ether, removing some color, covered with 100 ml. ether, adjusted to pH 2 with 5 M sulfuric acid, mixed and the ether separated. This ethereal extract was combined with two additional ether extracts (100 ml.) and the combined extracts containing the product, p-tolylpenicillin or 6-(4-methylbenzamido)-penicillanic acid, were washed with cold water and dried five minutes over $Na_2SO_4$. After removal of the drying agent by filtration, the addition of 9.7 ml. of dry n-butanol containing potassium 2-ethylhexanoate (0.373 gm./ml.) precipitated potassium 6-(4-methylbenzamido)penicillanate as a gum which solidified on trituration with ether and was collected, dried in vacuo over $P_2O_5$, found to weigh 4.05 gm., to melt at 163–165° C. (d.), to contain the β-lactam group by infrared analysis and to inhibit *Staph. aureus* Smith at a concentration of 1.25 mcg./ml.

The following examples will serve to illustrate this invention without limiting it thereto.

*Example 1*

In Procedure A, the p-toluic acid is replaced by 0.02 mole of 2,6-dimethylbenzoic acid, 2,6-diethylbenzoic acid and 2,6-diisopropylbenzoic acid, respectively, to produce the acids 6-(2,6-dimethylbenzamido)penicillanic acid, 6-(2,6-diethylbenzamido)penicillanic acid, and 6-(2,6-diisopropylbenzamido)penicillanic acid respectively, which are isolated as their water-soluble potassium salts and are found to contain the β-lactam ring structure as shown by infrared analysis and to inhibit *Staph. aureus* Smith at concentrations below 0.001 percent by weight.

*Example 2*

2,6-DIMETHYLPHENYLPENICILLIN (SODIUM SALT)

A solution of 2,6-dimethylbenzoyl chloride (7.53 g.) in dry alcohol-free chloroform (45 ml.) was added dropwise during 20 mins. to a stirred mixture of 6-aminopenicillanic acid (9.7 g.), triethylamine (12.6 ml.) and dry alcohol-free chloroform (90 ml.). After stirring for a further one hour, the mixture was washed with water (45 ml.) plus 1 N hydrochloric acid (45 ml., sufficient to give an aqueous phase of pH 2). The chloroform phase was then extracted with water (20 ml.) plus 3% w./v. aqueous sodium bicarbonate (126 ml., sufficient to give an aqueous phase of pH 7). Evaporation of the aqueous phase at low temperature and pressure gave the crude product as a pale yellow solid (8.1 g.).

The product inhibited Staph. Oxford at a concentration of 0.6 mcg./ml., Staph. 1 at 12.5 mcg./ml., and Staph. 2 at 6.25 mcg./ml., and exhibited unexpected stability to acid, facilitating oral administration in man.

*Example 3*

2-CHLORO-6-METHYLPHENYLPENICILLIN
(SODIUM SALT)

This compound was prepared, by the method of Example 2, from 2-chloro-6-methylbenzoyl chloride (8.62 g.), 6-aminopenicillanic acid (9.85 g.) and triethylamine (12.75 ml.) as a yellow powder (14.6 g.).

The product inhibited Staph. Oxford at a concentration of 0.5 mcg./ml., Staph. 1 at 6.25 mcg./ml., and Staph. 2 at 5 mcg./ml. and exhibited unexpected stability to acid, facilitating oral administration in man.

Staph. 1 and Staph. 2 are typical benzylpenicillin-resistant strains of Staphylococcus which are inhibited by benzylpenicillin only at concentrations of at least 50 mcg./ml.

While in the foregoing specification various embodiments of this invention have been set forth and specific details thereof elaborated for the purpose of illustration, it will be apparent to those skilled in the art that this invention is susceptible to other embodiments and that many of these details may be varied widely without departing from the basic concept and spirit of the invention.

We claim:
1. A compound selected from the group consisting of an acid having the formula:

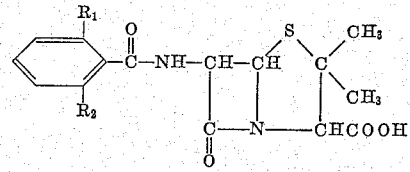

wherein $R_1$ represents a member selected from the group consisting of halogen and (lower)alkyl and $R_2$ represents (lower)alkyl, and its sodium, potassium, calcium, aluminum and ammonium salts and its nontoxic substituted ammonium salts with an amine selected from the group consisting of tri(lower)alkylamines, procaine, dibenzylamine, N-benzyl-beta-phenethylamine, 1-ephenamine, N,N'-dibenzylethylenediamine, dehydroabietylamine, N-(lower)-alkylpiperidines and N,N'-bis-dehydroabietylethylenediamine.

2. 6-(2,6-dimethylbenzamido)penicillanic acid.
3. 6-(2,6-diethylbenzamido)penicillanic acid.
4. 6-(2-chloro-6-methylbenzamido)penicillanic acid.
5. Sodium 6-(2,6-dimethylbenzamido)penicillanate.

References Cited in the file of this patent
UNITED STATES PATENTS

| | | |
|---|---|---|
| 2,479,295 | Behrens et al. | Aug. 16, 1949 |
| 2,528,176 | Rhodehamel | Oct. 31, 1950 |
| 2,756,226 | Kundl | July 24, 1956 |
| 2,951,839 | Doyle et al. | Sept. 6, 1960 |